US012592492B2

(12) United States Patent

Varheenmaa et al.

(10) Patent No.: US 12,592,492 B2

(45) Date of Patent: Mar. 31, 2026

(54) LOCATING ANTENNAS IN AN APPARATUS

(71) Applicant: Nokia Technologies Oy, Espoo (FI)

(72) Inventors: Harri Arttur Varheenmaa, Helsinki (FI); Pasi Yla-Oijala, Vantaa (FI); Anu Kristiina Lehtovuori, Espoo (FI); Ville Viikari, Espoo (FI)

(73) Assignee: Nokia Technologies Oy, Espoo (FI)

( * ) Notice: Subject to any disclaimer, the term of this patent is extended or adjusted under 35 U.S.C. 154(b) by 56 days.

(21) Appl. No.: 18/594,667

(22) Filed: Mar. 4, 2024

(65) Prior Publication Data

US 2024/0305004 A1 Sep. 12, 2024

(30) Foreign Application Priority Data

Mar. 9, 2023 (EP) .................................... 23160874

(51) Int. Cl.

*H01Q 13/10* (2006.01)
*H01Q 21/06* (2006.01)
*H01Q 21/30* (2006.01)

(52) U.S. Cl.

CPC ........... *H01Q 13/10* (2013.01); *H01Q 21/064* (2013.01); *H01Q 21/30* (2013.01)

(58) Field of Classification Search

CPC ...... H01Q 13/10; H01Q 21/064; H01Q 21/30; H01Q 5/40; H01Q 13/16; H01Q 5/371; H01Q 9/0407; H01Q 13/106; H01Q 21/28; H01Q 1/22; H01Q 1/36; H01Q 1/12; H01Q 1/48; H01Q 1/50; H01Q 21/00; H01Q 21/06

See application file for complete search history.

(56) References Cited

U.S. PATENT DOCUMENTS

| | | | | |
|---|---|---|---|---|
| 5,907,305 A * | 5/1999 | Epp | H01Q 9/0435 | 343/700 MS |
| 6,018,319 A * | 1/2000 | Lindmark | H01Q 13/106 | 343/770 |
| 6,181,281 B1 * | 1/2001 | Desclos | H01Q 9/0407 | 343/700 MS |
| 9,502,775 B1 * | 11/2016 | Gummalla | H01Q 3/247 | |
| 10,340,588 B2 | 7/2019 | Sudo et al. | | |
| 10,950,953 B2 * | 3/2021 | Ren | H01Q 21/08 | |

(Continued)

FOREIGN PATENT DOCUMENTS

CN 106921023 A 7/2017

*Primary Examiner* — Dameon E Levi

*Assistant Examiner* — Jordan E. DeWitt

(74) *Attorney, Agent, or Firm* — McCarter & English LLP

(57) ABSTRACT

An antenna module includes: a dielectric substrate including upper and lower edges, opposing side edges, and interior and exterior faces, the substrate being placed in an aperture of a rim of a device such that the upper edge of the substrate is aligned with an upper edge of the rim, the opposing side edges of the substrate are adjacent opposing side edges of the aperture of the rim, and the lower edge of the substrate is adjacent a lower edge of the aperture of the rim; one or more antenna elements positioned adjacent the exterior face of the substrate and fed through apertures in the substrate; and one or more conductive portions shaped to define at least a part of a perimeter of a slot of a slot antenna fed separately to the antenna elements. The antenna elements wholly overlap the conductive portions and do not overlap the slot.

14 Claims, 7 Drawing Sheets

(56) References Cited

U.S. PATENT DOCUMENTS

| | | | | |
|---|---|---|---|---|
| 2003/0164800 | A1* | 9/2003 | Jordan | H01Q 1/1271 343/713 |
| 2006/0208901 | A1* | 9/2006 | Kai | H01Q 9/0407 235/492 |
| 2009/0231215 | A1* | 9/2009 | Taura | H01Q 21/064 343/702 |
| 2009/0273529 | A1* | 11/2009 | Liu | H01Q 13/10 343/700 MS |
| 2010/0073238 | A1* | 3/2010 | Jun | H01Q 9/0457 343/700 MS |
| 2011/0018780 | A1* | 1/2011 | Tassoudji | H01Q 21/28 343/893 |
| 2014/0078009 | A1* | 3/2014 | Wong | H01Q 1/521 343/728 |
| 2015/0029068 | A1* | 1/2015 | Toyao | H01Q 5/385 343/770 |
| 2016/0104938 | A1 | 4/2016 | Hsu | |
| 2016/0204514 | A1* | 7/2016 | Miraftab | H01Q 21/005 343/731 |
| 2017/0098886 | A1* | 4/2017 | Kanazawa | H01Q 1/50 |
| 2017/0170553 | A1* | 6/2017 | Maas | H01Q 21/28 |
| 2017/0244171 | A1* | 8/2017 | Lee | H01Q 5/357 |
| 2017/0288295 | A1* | 10/2017 | Sultenfuss | H01Q 21/00 |
| 2017/0294705 | A1* | 10/2017 | Khripkov | H01Q 1/38 |
| 2018/0090843 | A1* | 3/2018 | Anderson | H01Q 9/0457 |
| 2018/0269585 | A1* | 9/2018 | Kim | H01Q 21/24 |
| 2019/0260127 | A1* | 8/2019 | Shi | H01Q 9/42 |
| 2021/0159608 | A1* | 5/2021 | Verd | H01Q 9/285 |
| 2021/0321268 | A1* | 10/2021 | Ly | H04L 5/0073 |
| 2021/0336316 | A1* | 10/2021 | Raphaeli | H01Q 21/0037 |
| 2021/0359404 | A1* | 11/2021 | Johansson | H01Q 21/065 |
| 2022/0123470 | A1 | 4/2022 | Kim et al. | |
| 2022/0418082 | A1* | 12/2022 | Son | H05K 1/0216 |
| 2024/0305004 | A1* | 9/2024 | Varheenmaa | H01Q 21/30 |

* cited by examiner

LOCATING ANTENNAS IN AN APPARATUS

TECHNOLOGICAL FIELD

Examples of the disclosure relate to antennas in an apparatus.

BACKGROUND

Modern apparatus require multiple antenna systems that can cover multiple frequency bands. It can be problematic finding good operational locations for the antenna systems in an apparatus.

BRIEF SUMMARY

According to various, but not necessarily all, examples there is provided an antenna arrangement comprising:

a dielectric substrate comprising an upper edge, a lower edge, opposing side edges, an interior face and an exterior face, wherein the dielectric substrate is configured to be sized to be placed in an aperture of a rim of a device such that, the opposing side edges of the dielectric substrate are adjacent opposing side edges of the aperture of the rim, the lower edge of the dielectric substrate is adjacent a lower edge of the aperture of the rim;

one or more antenna elements are positioned adjacent the exterior face of the dielectric substrate and are configured to be fed through corresponding one or more apertures in the dielectric substrate;

one or more conductive portions that are shaped to define at least a part of a perimeter of a slot of a slot antenna fed separately to the one or more antenna elements, are positioned adjacent the interior face of the dielectric substrate, wherein the one or more antenna elements are positioned to wholly overlap one or more of the one or more conductive portions and not to overlap the slot of the slot antenna.

In some, but not necessarily all examples, the dielectric substrate is configured to be sized to be placed in the aperture of the rim of the device such that the upper edge of the dielectric substrate is aligned with an upper edge of the rim.

In some, but not necessarily all examples, the slot is open at the upper edge of the dielectric substrate.

In some, but not necessarily all examples, the antenna arrangement comprises a second dielectric substrate comprising an upper edge, a lower edge, opposing side edges, an interior face and an exterior face, wherein the second dielectric substrate is configured to be sized to be placed in the aperture of the rim of the device such that the opposing side edges of the second dielectric substrate are adjacent opposing side edges of the aperture of the rim, the lower edge of the second dielectric substrate is adjacent a lower edge of the aperture of the rim.

In some, but not necessarily all examples, the second dielectric substrate comprises at least one aperture for feeding the slot antenna and one or more apertures for feeding the one or more antenna elements.

In some, but not necessarily all examples, the one or more apertures of the second dielectric substrate, the one or more apertures of the dielectric substrate and the one or more antenna elements are aligned and the at least one aperture in the second dielectric substrate for feeding the slot antenna is aligned with the slot of the slot antenna.

In some, but not necessarily all examples, the antenna arrangement comprises a first feed arrangement, extending from an interior portion of the second dielectric substrate to the antenna elements, and a second feed arrangement, extending from an interior portion of the second dielectric substrate to the slot of the slot antenna.

In some, but not necessarily all examples, the slot defined by one or more conductive portions comprises:

an elongate first slot-path extending lengthwise from a feed location in a first direction; and an elongate second slot-path extending lengthwise from the feed location in a second direction different to the first direction.

In some, but not necessarily all examples, the elongate first slot-path extends lengthwise a first distance in the first direction from the feed and then bifurcates, into an elongate first bifurcated slot path and an elongate second bifurcated slot path, wherein:

the elongate first bifurcated slot path is close-ended and terminates at a first closed end;

the elongate second bifurcated slot path is open-ended and terminates at an open end in an edge of the antenna arrangement; and the elongate second slot path is close-ended and terminates at a second closed end.

In some, but not necessarily all examples, the one or more antenna elements in combination with a ground plane provided by the one or more conductive portions, overlapped by the one or more antenna elements, provide one or more antennas.

In some, but not necessarily all examples, the one or more antenna elements are configured to operate at a higher frequency, greater than 20 Ghz, and the slot of the slot antenna is configured to operate at a lower frequency, less than 10 GHz.

In some, but not necessarily all examples, the one or more antenna elements are positioned closer to the upper edge of the dielectric substrate than a feed for the slot antenna or wherein the one or more antenna elements are positioned further from the upper edge of the dielectric substrate than a feed for the slot antenna.

In some, but not necessarily all examples, the antenna arrangement is configured as a module, wherein the module comprises a multilayer printed circuit board that provides the dielectric substrate, the one or more antenna elements and the one or more conductive portions.

In some, but not necessarily all examples, the antenna arrangement comprises at least one aperture; and, in the at least one aperture, a module comprising the antenna arrangement.

In some, but not necessarily all examples, the antenna arrangement comprises a rim and multiple antenna arrangements, each antenna arrangement being located within an aperture of the rim, wherein the antenna arrangements are arranged for multiple-input multiple-output (MIMO) operation.

According to various, but not necessarily all, examples there is provided an apparatus comprising a rim, wherein the rim comprises a first lower frequency slot antenna arrangement, dielectric and a second higher frequency antenna arrangement, the first lower frequency slot antenna arrangement comprising one or more conductive portions defining therebetween an open-ended slot of the first lower frequency slot antenna arrangement;

the second higher frequency antenna arrangement comprising one or more antenna elements directly opposing the one or more conductive portions of the first lower frequency slot antenna arrangement and being separated therefrom by the dielectric.

In some, but not necessarily all examples, the second higher frequency antenna arrangement is disposed opposite a radiator conductive element of the first lower frequency slot antenna arrangement.

In some, but not necessarily all examples, the first lower frequency slot antenna arrangement is disposed more towards an inner surface of the rim than the second higher frequency antenna arrangement.

According to various, but not necessarily all, examples there is provided an apparatus comprising:

a plurality of antenna elements defining a first layer;

a conductive member defining a second layer, the conductive member comprising a non-conductive slot and an elongate conductive portion arranged to define at least a part of the slot and comprising a plurality of enclosed apertures;

a first antenna feed comprising a plurality of conductive feed members defining a third layer, each of the plurality of conductive feed members extending at least partially across one of the plurality of enclosed apertures, wherein the plurality of antenna elements, the elongate conductive portion and the first antenna feed form an antenna array configured to operate in a first frequency band;

a second antenna feed coupled to the non-conductive slot to form a slot antenna configured to operate in a second frequency band, different from the first frequency band;

and wherein a dielectric layer is arranged between the first layer and the third layer.

In some, but not necessarily all examples, the conductive member in combination with the plurality of antenna elements defines an antenna array.

According to various, but not necessarily all, examples there is provided examples as claimed in the appended claims.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 6:
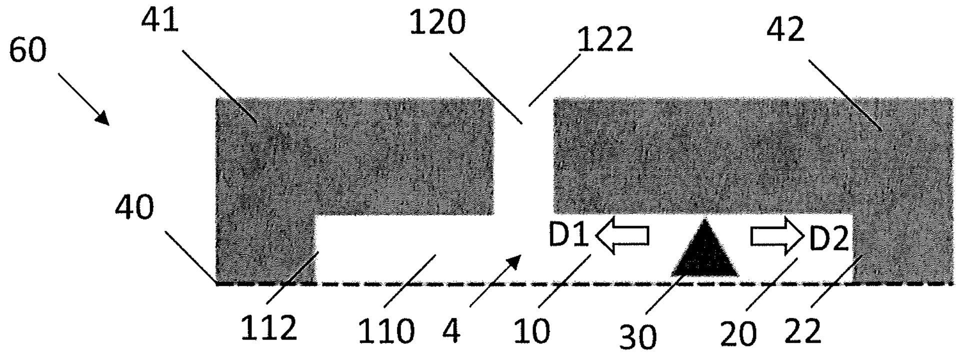
Figure 7:
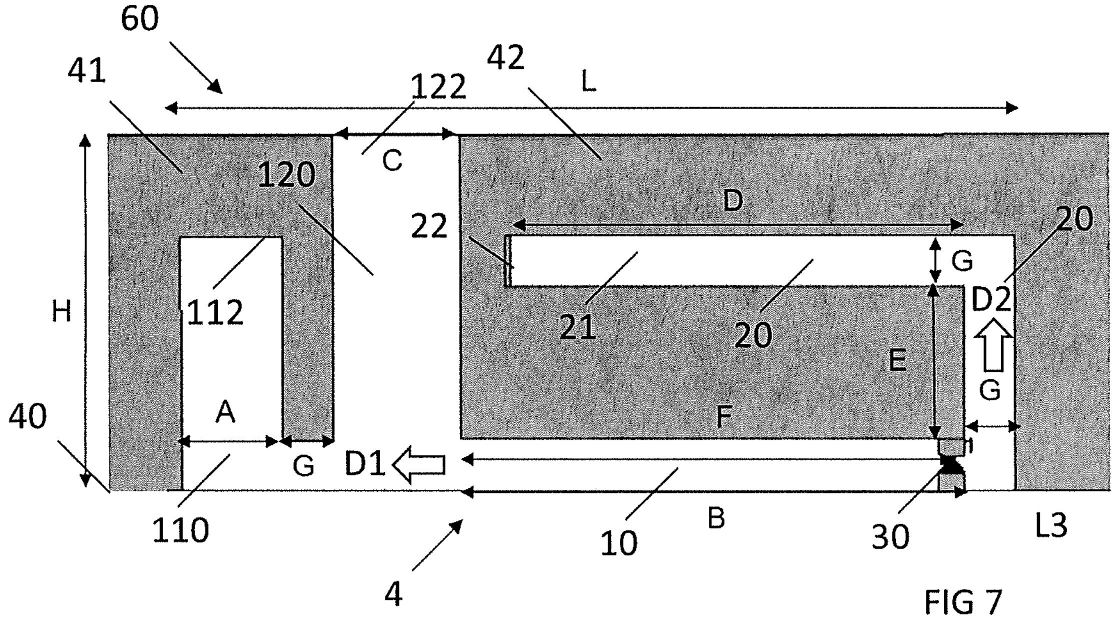
Figure 8A:
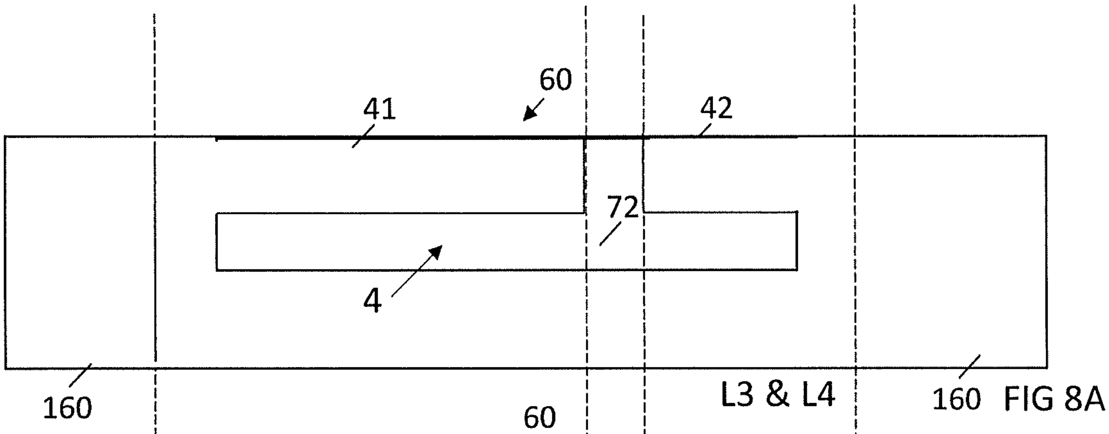
Figure 8B:
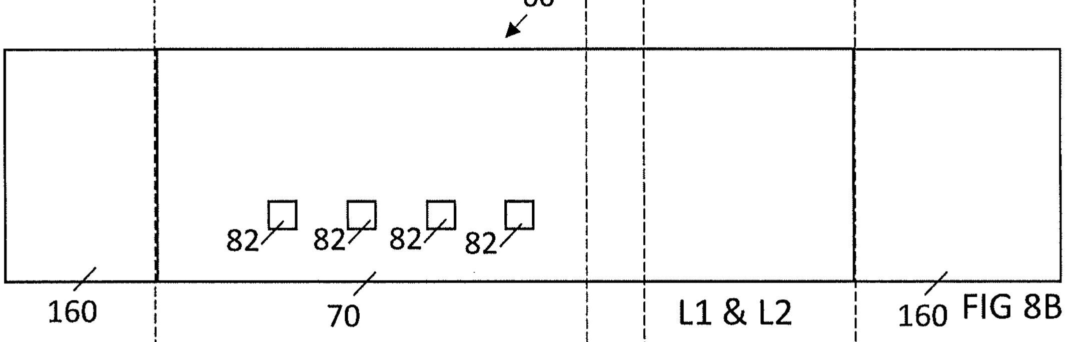
Figure 8C:
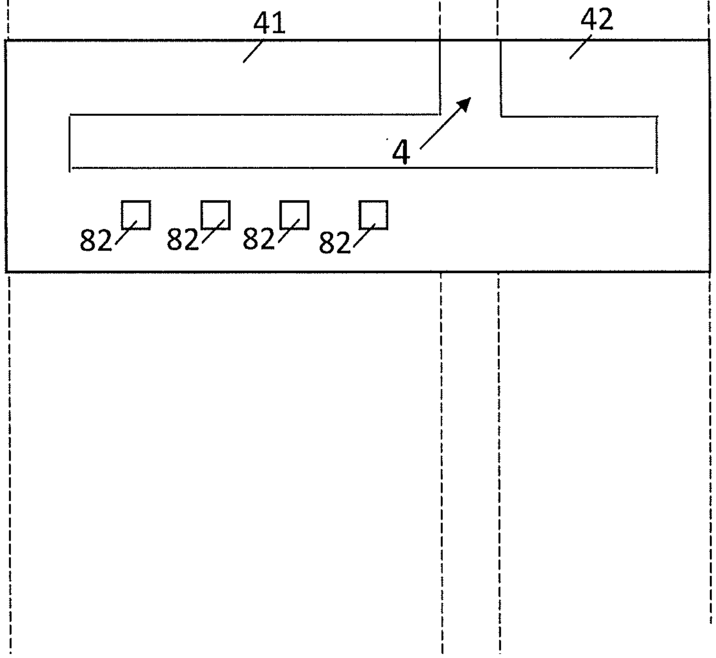
Figure 9A:
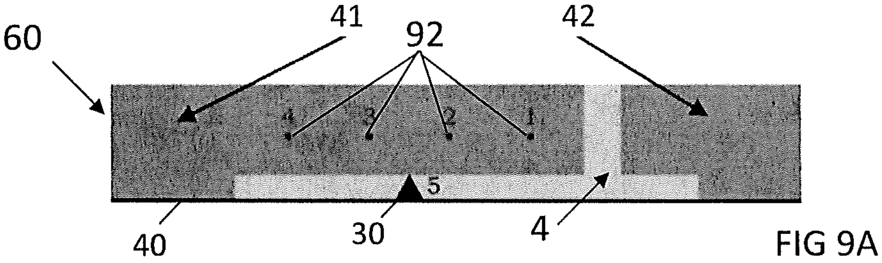
Figure 9B:
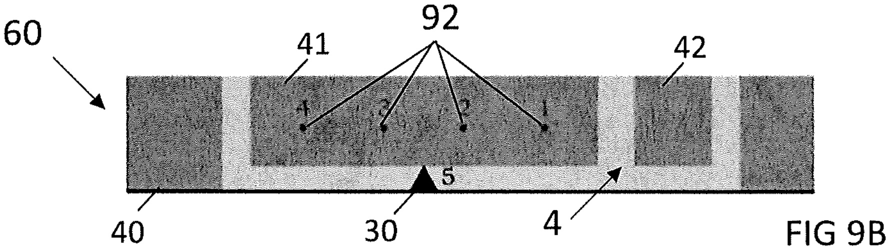
Figure 9C:
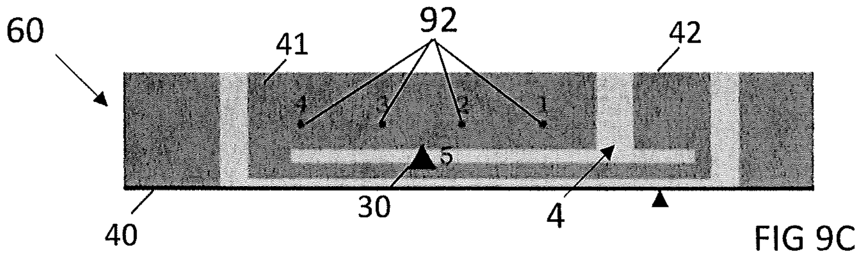
Figure 10:
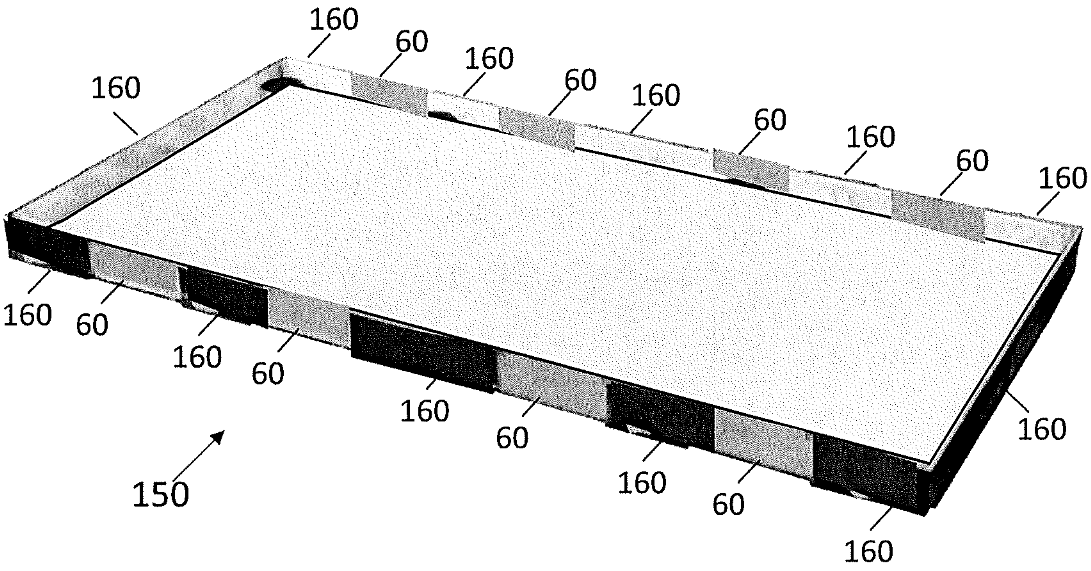

FIGS. 5A to 5F, separately show different examples of the subject matter described herein;

FIG. 6 shows another example of the subject matter described herein;

FIG. 7 shows another example of the subject matter described herein;

FIGS. 8A, 8B, 8C show another example of the subject matter described herein;

FIGS. 9A to 9C, separately show different examples of the subject matter described herein;

FIG. 10 shows another example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

The FIGs illustrate examples of an apparatus 60 comprising:

a dielectric substrate 70 comprising an upper edge 72, a lower edge 78, opposing side edges 74, 76, an interior face 71 and an exterior face 73, wherein the dielectric substrate 70 is sized to be placed in an aperture 170 of a rim 160 of an apparatus 150 such that the opposing side edges 74, 76 of the dielectric substrate 70 are adjacent opposing side edges 174, 176 of the aperture 170 of the rim 160, the lower edge 78 of the dielectric substrate 70 is adjacent a lower edge 178 of the aperture 170 of the rim 160;

one or more antenna elements 82 are positioned adjacent the exterior face 73 of the dielectric substrate 70 and are configured to be fed through corresponding one or more apertures 62 in the dielectric substrate 70;

one or more conductive portions 41, 42 that are shaped to define at least a part of a perimeter of a slot 4 of a slot antenna fed separately to the one or more antenna elements 82, are positioned adjacent the interior face 71 of the dielectric substrate 70, wherein the one or more antenna elements 82 are positioned to wholly overlap one or more of the one or more conductive portions 41, 42 and not to overlap the slot 4 of the slot antenna.

In some but not necessarily all examples, the dielectric substrate 70 is sized to be placed in an aperture 170 of a rim 160 of an apparatus 150 such that the upper edge 72 of the dielectric substrate 70 is aligned with an upper edge of the aperture. In some but not necessarily all examples, the dielectric substrate 70 is sized to be placed in an aperture 170 of a rim 160 of an apparatus 150 such that the upper edge 72 of the dielectric substrate 70 is aligned with an upper edge 162 of the rim 160.

In some but not necessarily all examples, the apparatus is a module, for example an antenna module.

In some examples, the antenna elements 82 are planar antenna elements. The planar antenna elements utilize the overlapping one or more conductive portions 41, 42 as a ground plane. In some but not necessarily all examples, the antenna elements are patch antenna elements.

The upper edge 72 of the dielectric substrate 70 is aligned with, that is flush with, the upper edge 162 of the rim 160.

In this document the term aperture is used to refer to a conduit that extends completely through an element. An aperture can be fully or partially surrounded by the element.

An aperture that is fully surrounded (enclosed) by the element can be described as a via or a through-hole. The aperture can, in some examples, be unfilled and in other examples be filled with different material to the surrounding element.

In this document the term slot is used to refer to an elongate absence of material from an element. A slot is an example of an aperture. A slot can branch one or more times. A slot can have an open end or a closed end. In some examples slots have parallel sides but this need not always be the case.

The antenna elements 82 can be disposed on the dielectric substrate 70. They can, for example, be accompanied by radio circuitry (receiver, transmitter or transceiver) disposed on the dielectric substrate 70, for example, close to the antenna elements 82. In at least some examples, the radio circuitry, when configured as a receiver or transceiver to receive, is configured to down-convert radio signals received via the antenna elements 82 to an intermediate frequency (IF) which is lower in frequency than the received radio signals. In at least some examples, the radio circuitry, when configured as a transmitter or transceiver to transmit, is configured to up-convert signals at an intermediate frequency (IF) to radio signals for transmission via the antenna elements 82, where the intermediate frequency (IF) is a lower in frequency than the transmitted radio signals. In other examples, the radio circuitry for the antenna elements 82 can be disposed on a different substrate, for example a second substrate such as a second dielectric substrate 80.

Figures 1A, 1B:
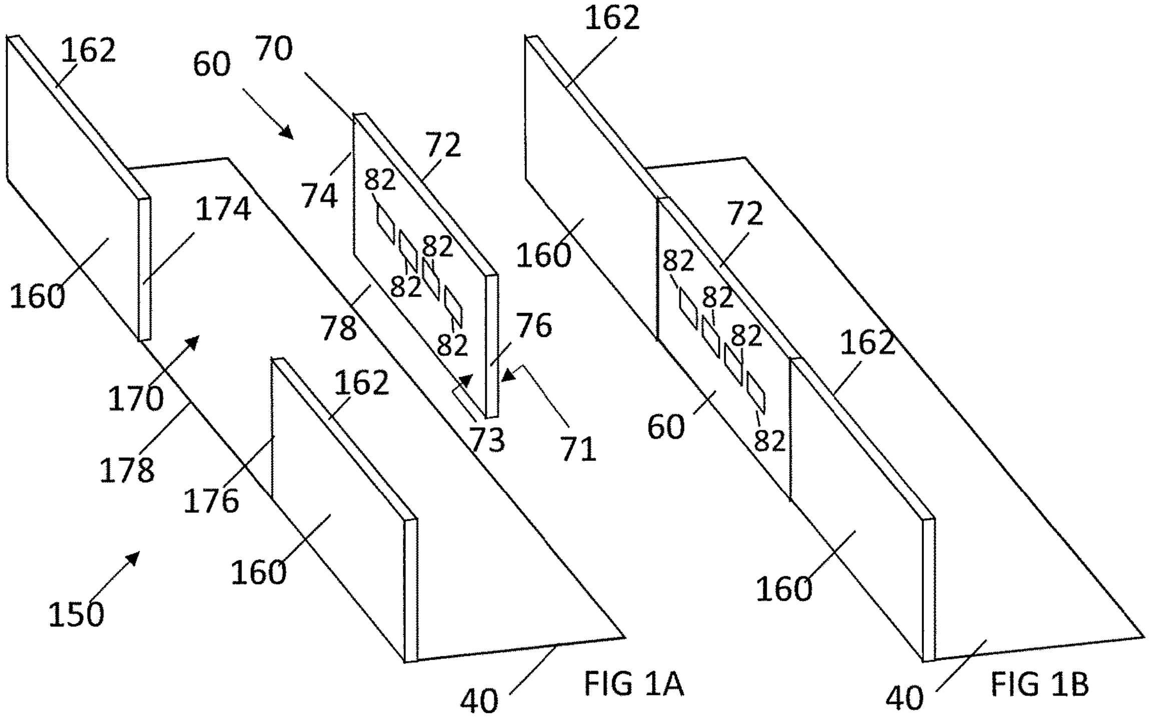
FIG. 1A shows an example of the subject matter described herein.
FIG. 1B shows another example of the subject matter described herein.

FIG. 1A, 1B illustrates a portion of an example of an apparatus 150. FIG. 1A illustrates an unassembled configuration when the module 60 is separated from the apparatus 150. FIG. 1B illustrates an assembled configuration when the module 60 is snugly placed within the aperture 170 of the rim 160 of an apparatus 150.

In FIGS. 1A and 1B, but not necessarily all examples, the apparatus 150 comprises a ground plane 40. In this example, the ground plane 40 is planar (flat) and is perpendicular to the planar (flat) side wall formed by the rim 160.

Figure 2:
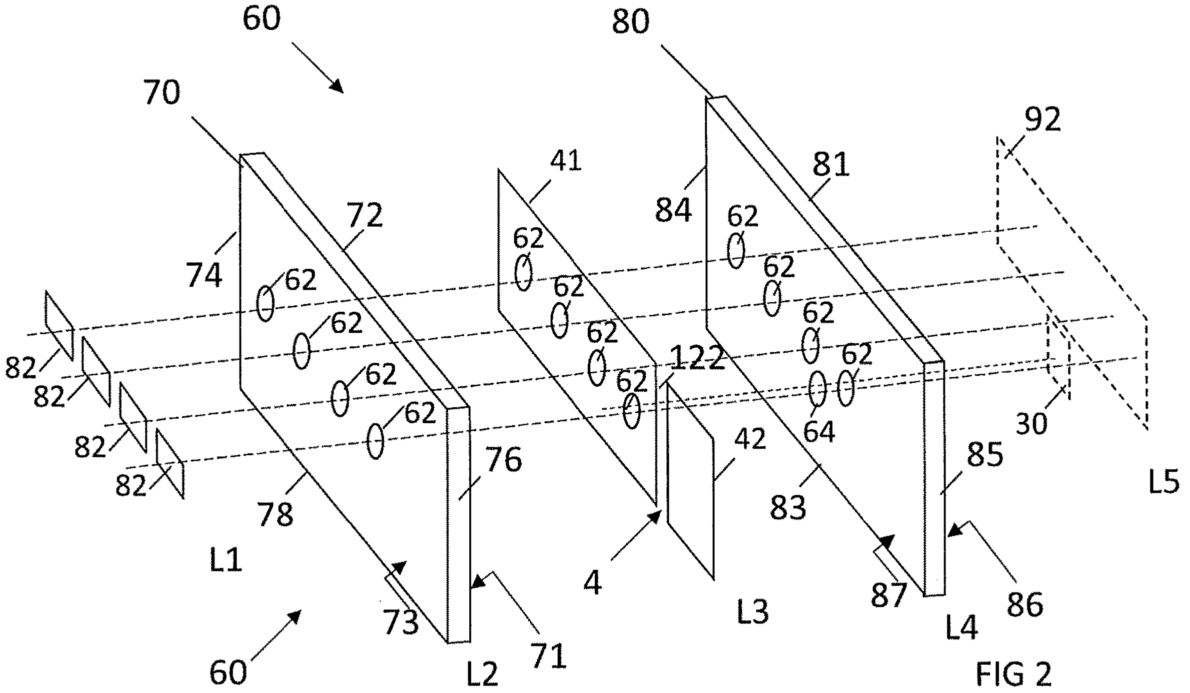
FIG. 2 shows another example of the subject matter described herein.

FIG. 2 illustrates the components of the module 60.

The dielectric substrate 70 comprises the upper edge 72, the lower edge 78, opposing side edges 74, 76, the interior face 71 and the exterior face 73. The dielectric substrate 70 is sized to be placed in the aperture 170 in the rim 160 of the apparatus 150 such that the opposing side edges 74, 76 of the dielectric substrate 70 are adjacent opposing side edges 174, 176 of the aperture 170 in the rim 160, and the lower edge 78 of the dielectric substrate 70 is adjacent a lower edge 178 of the aperture 170 in the rim 160.

The dielectric substrate 70 is sized to be placed in the aperture 170 in the rim 160 of the apparatus 150 such that the upper edge 72 of the dielectric substrate 70 is aligned with an upper the aperture in the rim 160. In this example, the dielectric substrate 70 is sized to be placed in the aperture 170 in the rim 160 of the apparatus 150 such that the upper edge 72 of the dielectric substrate 70 is aligned with the upper edge 162 of the rim 160.

One or more patch antenna elements 82 are positioned adjacent the exterior face 73 of the dielectric and are configured to be fed through corresponding one or more apertures 62 in the dielectric substrate 70.

One or more conductive portions 41, 42 that are shaped to define at least a part of a perimeter of a slot 4 of a slot antenna fed separately to the one or more patch antenna elements 82, are positioned adjacent the interior face 71 of the dielectric substrate 70.

The one or more patch antenna elements 82 are positioned to wholly overlap one or more of the one or more conductive portions 41 and not to overlap the slot 4 of the slot antenna. In the example illustrated each patch antenna element 82 is positioned to wholly overlap the conductive portion 41.

It can be seen from the FIG that the slot 4 is open ended 122 at the upper edge 72 of the dielectric substrate 70. That is there is an elongate gap that separates the conductive portions 41, 42 at least near the edge 72.

In this example, the module 60 additionally comprises a second dielectric substrate 80. The second dielectric substrate 80 comprises an upper edge 81, a lower edge 83, opposing side edges 84, 85, an interior face 86 and an exterior face 87. The second dielectric substrate 80 is sized to be placed in the aperture 170 of the rim 160 of the apparatus 150 such that the upper edge 81 of the second dielectric substrate 80 is aligned with the upper edge 162 of the rim 160, the opposing side edges 84, 85 of the second dielectric substrate 80 are adjacent opposing side edges 174, 176 of the aperture 170 of the rim 160, the lower edge 83 of the second dielectric substrate 80 is adjacent a lower edge 178 of the aperture 170 of the rim 160.

The one or more conductive portions 41, 42 are positioned adjacent the exterior face 87 of the second dielectric substrate 80.

In some but not necessarily all examples, the dielectric substrate 70 comprises one or more apertures 62 for feeding the one or more patch antenna elements 82. In this example, the dielectric substrate 70 comprises a single, separate aperture 62 for feeding each one of the multiple patch antenna elements 82.

In some but not necessarily all examples, the second dielectric substrate 80 comprises one or more apertures 64 for feeding the slot 4 of the slot antenna and one or more apertures 62 for feeding the one or more patch antenna elements 82. In this example, the second dielectric substrate 80 comprises one aperture 64 for feeding the slot 4 of the slot antenna and a single, separate aperture 62 for feeding each one of the multiple patch antenna elements 82.

The one or more conductive portions 41, 42 comprise one or more apertures 62 for feeding the one or more patch antenna elements 82. In this example, the conductive portion 41 comprises a single, separate aperture 62 for feeding each one of the multiple patch antenna elements 82.

The one or more apertures 62 in the second dielectric substrate 80; the one or more apertures 62 in the conductive portions 41, 42; the one or more apertures 62 in the dielectric substrate 70 and the one or more patch antenna elements 82 are aligned, as illustrated. For each one of the patch antenna elements 82, a virtual straight line passing through the patch antenna element 82 also passes through a corresponding aperture 62 in the dielectric substrate 70, a corresponding aperture in the conductive portions 41, 42 and a corresponding aperture 62 in the dielectric substrate 80. The virtual lines are parallel.

A first feed arrangement 92 extends from an interface portion at the interior face 86 of the second dielectric 80 to the patch antenna elements 82 through the apertures 62 in the second dielectric substrate 80, conductive portions 41, 42 and in the dielectric substrate 70.

A second feed arrangement 30 extends from an interface portion at the interior face 86 of the second dielectric 80 to the slot 4 of the slot antenna through the one or more apertures 64 in the second dielectric substrate 80.

The patch antenna elements 82 in combination with a ground plane form an array of patch antennas. The ground plane is provided by the conductive portion(s) 41, 42.

The conductive portions 41, 42 can be galvanically connected to a further ground plane, for example, a main ground plane 40 and/or the conductive rim 160.

In the example illustrated the patch antenna elements 82 are regularly arranged and in combination with a ground plane form an array of patch antennas.

The one or more patch antenna elements 82 are positioned relative to the one or more conductive portions 41, 42 of the slot antenna to provide a radiation pattern that overlaps a radiation pattern produced by the slot antenna.

The one or more patch antenna elements 82 are positioned relative to the one or more conductive portions 41, 42 to provide an antenna aperture that overlaps an antenna aperture 170 of the slot antenna.

The module is formed from multiple layers (L1, L2, L3, L4, L5). The layer L1 comprises the patch antenna elements 82. The layer L2 comprises the dielectric substrate 70, which is a planar dielectric substrate. The layer L3 comprises the conductive portions 41, 42 used to define at least a portion of the slot 4 of the slot antenna. The layer L4 comprises the second dielectric substrate 80, which is a planar dielectric substrate. The layer L5 comprises interfaces for the first feed arrangement 92 and the second feed arrangement 30. The multiple layers can be joined together as a stack.

The layer L1 can be over-molded or otherwise covered/hidden/protected to protect the antenna array (the plurality of antenna elements 82).

Figures 3A, 3B, 3C:
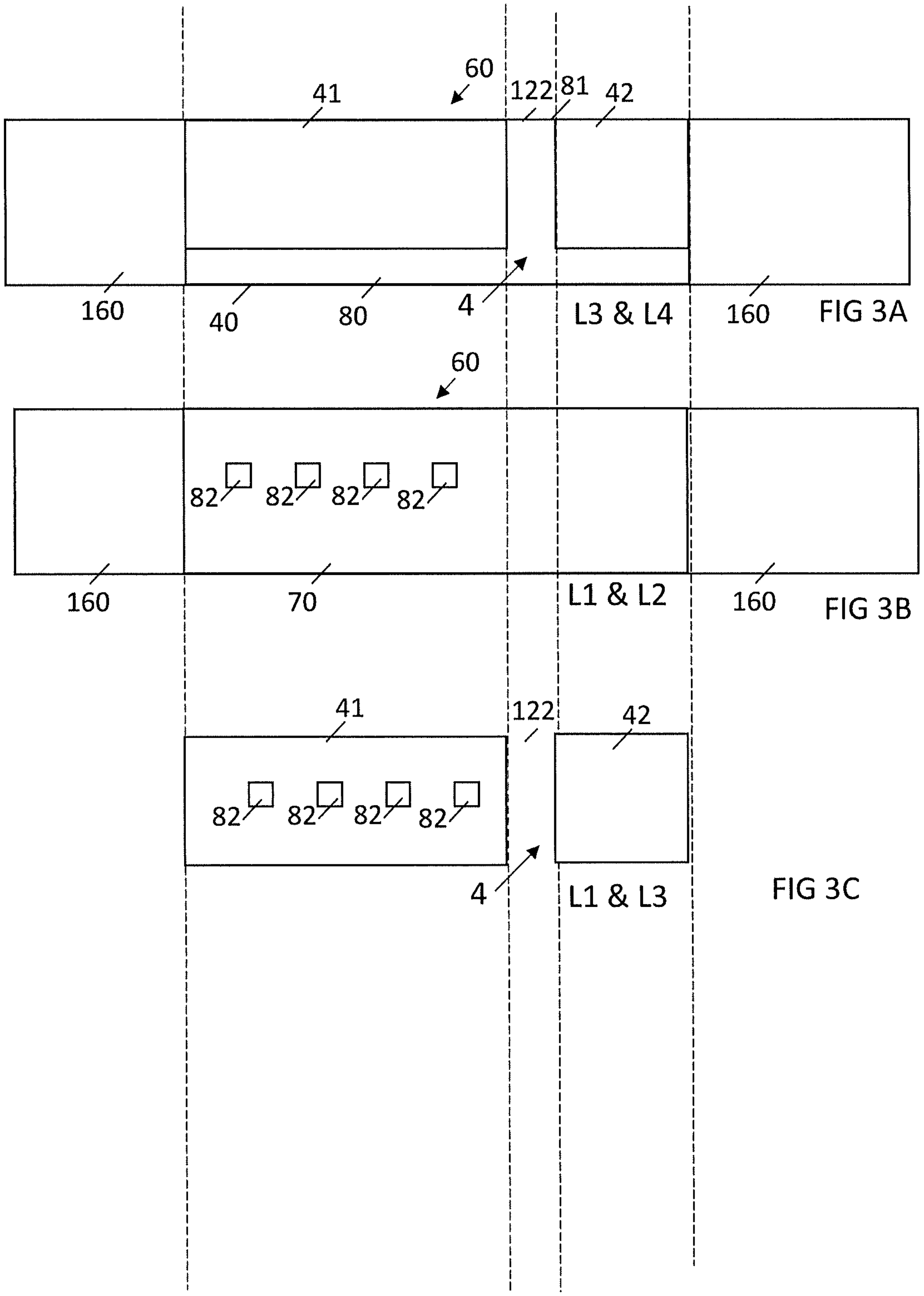
FIG. 3A, 3B, 3C show another example of the subject matter described herein.

FIG. 3A illustrates a layered combination of the layers L3 (conductive portions 41, 42) and L4 (second dielectric substrate 80). It can be seen how the conductive portions 41, 42 in combination with the rim 160 and ground plane 40 defines a slot 4 of the slot antenna in the layer L3. The second dielectric layer 80, in layer 4, can be seen through the slot 4.

The slot 4 has three distinct slot paths, two of which are closed and one of which is open 122. The slot 4 is open at the upper edge 72 of the dielectric substrate 70 and at the upper edge 81 of the second dielectric substrate 80.

FIG. 3B illustrates a layered combination of the layers L1 (patch antenna elements 82) and L2 (dielectric substrate 70). It can be seen how the patch antenna elements 82 are separated from the conductive portions 41, 42 by the dielectric substrate 70.

FIG. 3C illustrates a layered combination of the layers L1 (patch antenna elements 82) and L3 (conductive portions 41, 42), with the intervening layer L2 (dielectric substrate 70) having been removed for the purpose of illustration. It can be seen how the patch antenna elements 82 overlap the conductive portion 41.

A metallic part 41 of the slot antenna acts as a ground plane for the patch antenna array. The slot antenna and the patch antenna array share the same antenna aperture.

In at least some examples, the dielectric substrate 70 and/or the second dielectric substrate 80 are supporting substrates.

In some embodiments the substrate(s) 70, 80 could be much larger than shown and extend in one or more direction to be used for other components/antennas or for mechanical fixing or support purposes.

In at least some examples, the dielectric substrate 70 and/or the second dielectric substrate 80 are layers in a multilayer printed circuit board. The module 60 can be provided as a printed circuit board comprising layers L1, L2, L3, L4, L5. The layer L1 comprises the patch antenna elements 82. The layer L2 comprises the dielectric substrate 70, which is a planar dielectric substrate. The layer L3 comprises the conductive portions 41, 42 used to define at least a portion of the slot 4 of the slot antenna. The layer L4 comprises the second dielectric substrate 80, which is a planar dielectric substrate. The layer L5 comprises interfaces for the first feed arrangement 92 and the second feed arrangement 30.

Figure 4A:
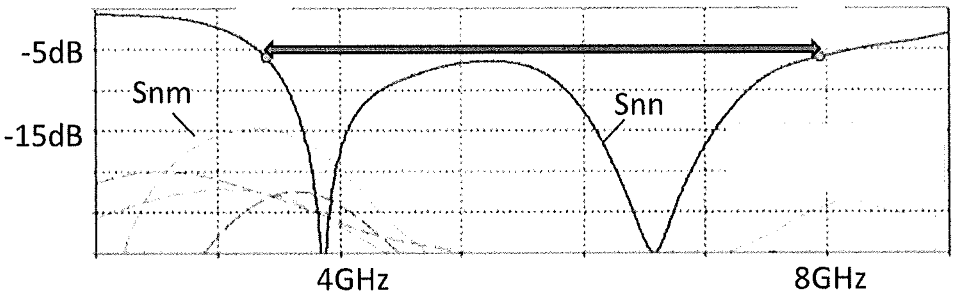
FIGS. 4A, 4B show another example of the subject matter described herein.

FIG. 4A illustrates S parameters for the slot antenna. The plot illustrates reflection parameters Snn (solid lines) and also transmission (isolation) parameters Snm (dashed lines). The slot antenna has a wide lower frequency operational bandwidth. In this example, the lower frequency operational band width is more than 3 GHZ and the upper frequency range of the operational frequency band is less than 10 GHz. It has a bandwidth of 3.3-7.4 GHz at −6 dB. Cross-coupling or isolation is below −15 dB.

Figure 4B:
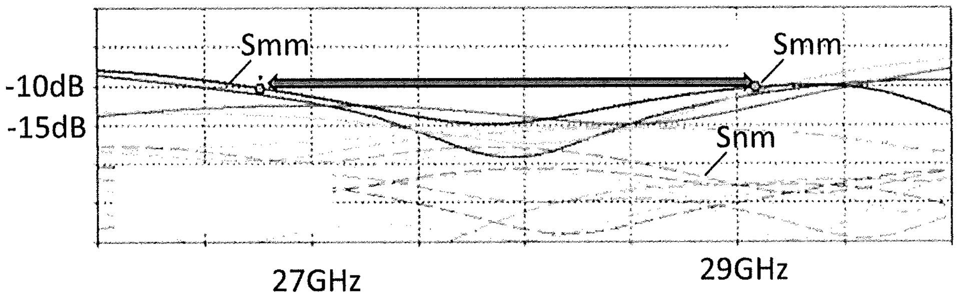

FIG. 4B illustrates S parameters for the patch antennas arranged to form an antenna array. The plot illustrates reflection parameters Snn (solid lines) and also transmission (isolation) parameters Snm (dashed lines). The patch antennas have a wide higher frequency operational bandwidth. In this example, the higher frequency operational bandwidth has a bandwidth of more than 2 GHZ and the lowest frequency range of the operational bandwidth is more than 20 GHz. It has a bandwidth of 26.7-29 GHz at −10 dB. Cross-coupling or isolation is below −15 dB.

At these operational frequencies the module 60 can have a size of 26.5×0×7 mm.

The patch antennas can be operated with dual polarization.

FIGS. 5A to 5F illustrate examples of different modules 60. The FIGs illustrate a layered combination of the layers L1 (patch antenna elements 82) and L3 (conductive portions 41, 42), with the intervening layer L2 (dielectric substrate 70) having been removed for the purpose of illustration. It can be seen how the patch antenna elements 82 overlap the conductive portion 41. The FIGs are therefore similar to FIG. 3C.

The modules 60 illustrated in FIG. 3C and FIGS. 5A to 5F differ in:

- shape of the slot 4 (shape of the conductive portions 41, 42);
- whether the slot 4 is directly adjacent or separated from the ground plane 40 (whether the conductive portions 41, 42 extend under the slot 4;
- whether or not a gap separates the conductive portions 41, 42 from the ground plane 40 and/or the rim 160;
- the shape of the patch antenna element 82;
- the position of the patch antenna elements 82 relative to the slot 4.

The modules 60 illustrated in FIG. 3C and FIGS. 5A to 5F are similar in that:

- the patch antenna elements completely overlap one or more of the conductive portions 41, 42
- the patch antenna elements do not partially overlap the slot 4;
- the patch antenna elements use conductive portions 41, 42 as a ground plane.

In FIG. 5A, 5B, 5D, 5E the slot 4 is directly adjacent the ground plane 40. The conductive portions 41, 42 do not extend under the slot 4 between the slot 4 and the ground plane 40.

Figure 5A:
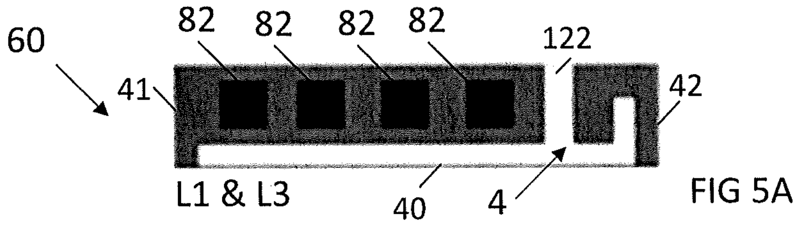
Figure 5B:
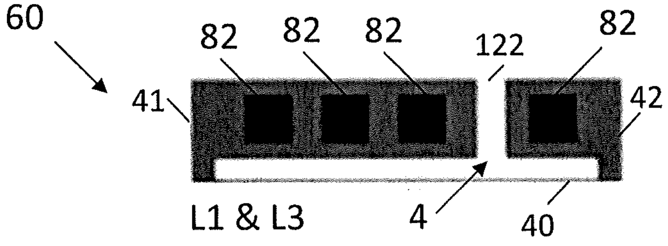
Figure 5C:
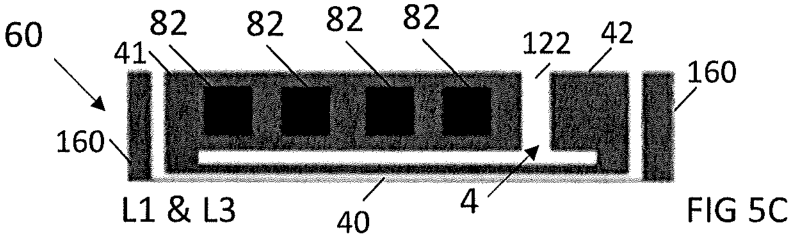
Figure 5D:
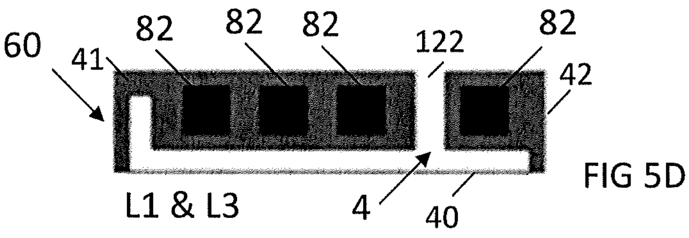
Figure 5E:
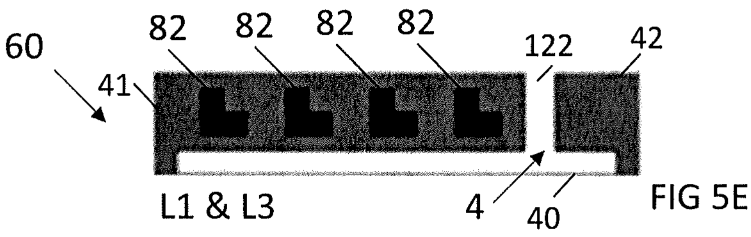
Figure 5F:
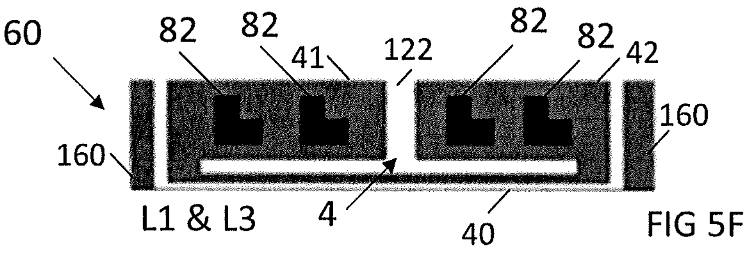

In FIG. 5C, 5F the slot 4 is not directly adjacent the ground plane 40. The slot 4 is separated from the ground plane 40. The conductive portions 41, 42 extend under the slot 4 between the slot 4 and the ground plane 40.

In FIG. 5C, 5F a gap separates the conductive portions 41, 42 from the ground plane 40 and the rim 160. In FIG. 5A, 5B, 5D, 5E no gap separates the conductive portions 41, 42 from the ground plane 40 or the rim 160.

In FIG. 5E, 5F the patch antenna elements 82 are differently shaped.

In FIG. 5B, 5D, 5F the patch antenna elements 82 are placed on both sides of the open slot path of the slot 4 that extends to the top edge of the rim 160.

FIGS. 6 and 7 illustrate different examples of modules 60 comprising slots 4. In these examples, the slot 4 defined by the conductive portions 41, 42 comprises:

- an elongate first slot-path 10 extending lengthwise from the feed 30 in a first direction D1; and
- an elongate second slot-path 20 extending lengthwise from the feed 30 in a second direction D2 different to the first direction D1.

The elongate first slot-path 10 extends lengthwise a first distance in the first direction D1 from the feed 30 and then bifurcates, into an elongate first bifurcated slot path 110 and an elongate second bifurcated slot path 120.

The elongate first bifurcated slot path 110 is close-ended and terminates at a first closed end 112.

The elongate second bifurcated slot path 120 is open-ended and terminates at an open end 122 in the upper edge of the conductive portions 41, 42.

The elongate second slot path 20 is close-ended and terminates at a second closed end 22.

In FIG. 6, the elongate first slot-path 10 has a T-shape and the elongate second path 20 has an I-shape.

In FIG. 7, the elongate first slot-path 10 has an F-shape and the elongate second path 20 has a J-shape (or L-shape).

FIGS. 8A, 8B, 8C are similar to FIGS. 3A, 3B, 3C. A primary difference is the location of the patch antenna elements 82 relative to the slot 4.)

In FIGS. 3A-3C, the patch antenna elements 82 are positioned closer to the upper edge 72 of the dielectric substrate 70 than the feed 30 for the slot antenna. The patch antenna elements 82 are positioned further from the lower edge 78 of the dielectric substrate 70 than the feed for the slot antenna.

However, in FIGS. 8A-8C, the patch antenna elements 82 are positioned further from the upper edge 72 of the dielectric substrate 70 than the feed 30 for the slot antenna. The patch antenna elements 82 are positioned closer to the lower edge 78 of the dielectric substrate 70 than the feed 30 for the slot antenna.

In FIGS. 8A-8C, the position of the lowest portion of the slot 4 has been raised and the position of the array of patch antenna elements 82 has been lowered. The ordering of the lowest portion of the slot 4 and the array of patch antenna elements 82 has been swapped. In FIGS. 3A-3C, the lowest portion of the slot 4 is below the array of patch antenna elements 82. In FIGS. 8A-8C, the lowest portion of the slot 4 is above the array of patch antenna elements 82.

This moves the feed arrangement 92 for the patch antenna elements 82 (see FIG. 2) from being above the feed arrangement 30 for the slot antenna to being below the feed arrangement 30 for the slot antenna. The slot 4 does not then separate the patch feed arrangement from the ground plane 30 of the apparatus 150.

FIGS. 9A, 9B, 9C illustrate different implementation for connecting the rim 160 and ground plane 40 to the module 60 (and in particular to the slot antenna).

FIG. 9A illustrates a galvanic (in other words, theoretically a direct current (DC) could flow between the ground plane 40 and the conductive portion 41) connection both to the ground plane 40 and the conductive portion 41 (which is galvanically interconnected to the rim 160 when the module 60 is inserted into the rim 160).

FIG. 9B illustrates a galvanic (DC) connection to the ground plane 40 and without a galvanic connection to the conductive portion 41 (which is not galvanically interconnected to the rim 160 when the module 60 is inserted into the rim 160).

FIG. 9C illustrates a galvanic (DC) connection to the ground plane 40 and without a galvanic connection to the conductive portion 41 (which is not galvanically interconnected to the rim 160 when the module 60 is inserted into the rim 160).

FIG. 10 illustrates an example of the apparatus 150.

The apparatus 150 comprises a rim 160. The rim 160 comprises a first lower frequency slot antenna arrangement, dielectric and a second higher frequency patch antenna arrangement.

The first lower frequency slot antenna arrangement comprises one or more conductive portions 41, 42 defining therebetween an open-ended slot 4 of the slot antenna arrangement.

The second higher frequency patch antenna arrangement comprises one or more patch antenna elements 82 directly opposing one or more of the one or more conductive portions 41, 42 of the first lower frequency slot antenna arrangement and being separated therefrom by the dielectric.

The second higher frequency patch antenna arrangement is disposed opposite a radiating conductive element 41, 42 of the first lower frequency slot antenna arrangement. The radiator conductive element 41, 42 of the first lower frequency slot antenna arrangement provides a ground plane to the second higher frequency patch antenna arrangement.

The first lower frequency slot antenna arrangement is disposed more towards an inner surface of the rim 160 than the second higher frequency patch antenna arrangement.

In this example, apertures of the rim 160 have received modules 60, as previously described. A module 60 configures the first lower frequency slot antenna arrangement, the dielectric and the second higher frequency patch antenna arrangement as previously described.

The apertures in rim 160 can be defined by removal of a whole of rim 160 from a portion of the rim 160 or by removal of a portion of the rim. In the former case, the lower edge 178 of the aperture 170 of the rim 160 is defined by a ground plane 40.

The multiple modules 60 provide multiple lower frequency slot antenna arrangements which can be used for multiple-input multiple-output (MIMO) operation. The multiple modules 60 form a MIMO array.

Multiple higher frequency patch antenna arrays disposed around the perimeter of a device may be beneficial in some embodiments where directional radiation pattern control is enhanced by having greater granularity in a 3D space for radiation gain.

In some but not necessarily all examples, the apparatus 150 comprises: a plurality of antenna elements 82 defining a first layer L1;

- a conductive member 41, 42 defining a third layer L3, the conductive member 41, 42 comprising a non-conductive slot 4 and an elongate conductive portion 41 arranged to define at least a part of the slot and comprising a plurality of enclosed apertures 62;
- a first antenna feed 92 comprising a plurality of conductive feed members defining a fifth layer L5, each of the plurality of conductive feed members extending at least partially across one of the plurality of enclosed apertures 62, wherein the plurality of antenna elements 82, the elongate conductive portion 41 and the first antenna feed 92 form an antenna array configured to operate in a first frequency band;

a second antenna feed 30 coupled to the non-conductive slot 4 to form a slot antenna configured to operate in a second frequency band, different from the first frequency band;

and wherein a dielectric second layer L2 is arranged between the first layer L1 and the third layer L3 and a dielectric fourth layer L4 is arranged between the third layer L3 and the fifth layer L5.

The conductive member 41, 42 shares the same space with an antenna array.

The conductive member 41, 42 acts as at least a portion of a slot antenna radiator (the metallization around the slot forms the slot antenna radiator. The conductive member 41, 42 provide at least a portion of the total metallization (or conductive members) required to form the slot antenna radiator).

The first frequency band is higher than the second frequency band.

The slot 4 has a single opening at a gap at a long edge of the conductive member 41, 42.

The slot 4 has 3 sub-slots, one of which is open and two of which are closed.

The first layer L1 can be at least partially over-molded, encapsulated or otherwise covered/hidden/protected to form an external surface of the electronic apparatus 150 with a further non-conductive member. This is to protect the antenna array (the plurality of antenna elements 82) from dirt, dust, breakage, etc.

The apparatus 150 described in any of the examples can be a mobile telephone, a smartphone or a handheld apparatus, a laptop, a tablet, or any other electronic apparatus which requires wireless communication.

The modules 60 can be formed using different techniques. For example, techniques include but are not limited to: stamped sheet metal, machined metal, printed conductive layers on circuit boards, molded interconnect apparatus (MID), laser direct structuring (LDS), and other suitable methods of producing antennas for electronic apparatus.

The example described above may include the following alternative features:

- the slot 4 can have several branches
- the slot 4 can be rounded or rectangular
- the slot 4 can have different shapes
- the design may include several slots 4
- metallic pieces 41, 42 can be in parallel planes
- metallic pieces 41, 42 can have different shapes
- the number of patch antenna elements 82 can be one or more
- the patches 82 can have different shapes
- each patch 82 can have one or multiple feeds
- each patch antenna element 82 can have only a feed arranged to couple to radio frequency circuitry (for example, and not limited to, a radio receiver, a radio transmitter or a radio transceiver) or each patch antenna element 82 can have a feed arranged to couple to radio frequency circuitry and a ground connection between the antenna element and the ground plane 40 (or other grounded part of the device)
- the design may include one or more dielectric substrates 70, 80
- the feed(s) 30, 92 can be galvanic or capacitive
- several antennas (modules 60) can be used in the same metal rim 160
- resonance frequency of the slot antenna can be shifted by changing the dimensions and shape of the slot 4
- matching circuits can be used to improve impedance matching and total efficiency.

Where a structural feature has been described, it may be replaced by means for performing one or more of the functions of the structural feature whether that function or those functions are explicitly or implicitly described.

An operational resonant mode (operational bandwidth) is a frequency range over which an antenna can efficiently operate. An operational resonant mode (operational bandwidth) may be defined as where the return loss S11 (S-Parameter) of the dipole antenna 20 is greater than an operational threshold T such as, for example, 3 or 4 dB and where the a radiated efficiency (er) is greater than an operational threshold such as for example −3 dB in an efficiency plot. Radiation efficiency is the ratio of the power delivered to the radiation resistance of the antenna (Rrad) to the total power delivered to the antenna: er=(Rrad)/(RL+Rrad), where RL=loss resistance (which covers dissipative losses in the antenna itself). It should be understood that "radiation efficiency" does not include power lost due to poor VSWR (mismatch losses in the matching network which is not part of the antenna as such, but an additional circuit). The "total radiation efficiency" comprises the "radiation efficiency" and power lost due to poor VSWR [in dB]. The efficiency operational threshold could alternatively be expressed in relation to "total radiation efficiency" rather than "radiation efficiency".

As used here 'module' refers to a unit or apparatus that excludes certain parts/components that would be added by an end manufacturer or a user.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An antenna arrangement, comprising:

a dielectric substrate comprising an upper edge, a lower edge, opposing side edges, an interior face and an exterior face, wherein the dielectric substrate is configured to be sized to be placed in an aperture of a device, the aperture being located at a rim defined by an edge of the device, such that the opposing side edges of the dielectric substrate are adjacent opposing side edges of the aperture and the lower edge of the dielectric substrate is adjacent a lower edge of the aperture;

multiple patch antenna elements positioned adjacent the exterior face of the dielectric substrate and configured to be fed through corresponding one or more apertures in the dielectric substrate; and one or more conductive portions shaped to define at least a part of a perimeter of a slot of a slot antenna fed separately to the multiple patch antenna elements, the one or more conductive portions being positioned adjacent the interior face of the dielectric substrate;

wherein the multiple patch antenna elements are positioned to wholly overlap one or more of the one or more conductive portions and not to overlap the slot of the slot antenna;

wherein the multiple patch antenna elements are configured to operate, as an antenna array, at a frequency greater than 20 gigahertz and the slot of the slot antenna is configured to operate at a frequency less than 10 gigahertz; and wherein the slot antenna and the antenna array share a same antenna aperture.

2. The antenna arrangement as claimed in claim 1, wherein the dielectric substrate is configured to be sized to be placed in the aperture located at the rim of the device such that the upper edge of the dielectric substrate is aligned with an upper edge of the device.

3. The antenna arrangement as claimed in claim 1, wherein the slot is open at the upper edge of the dielectric substrate.

4. The antenna arrangement as claimed in claim 1, comprising a second dielectric substrate comprising an upper edge, a lower edge, opposing side edges, and an interior face and an exterior face, wherein the second dielectric substrate is configured to be sized to be placed in the aperture such that the opposing side edges of the second dielectric substrate are adjacent opposing side edges of the aperture, the lower edge of the second dielectric substrate being adjacent a lower edge of the aperture.

5. The antenna arrangement as claimed in claim 4, wherein the second dielectric substrate comprises at least one aperture for feeding the slot antenna and one or more apertures for feeding the multiple patch antenna elements.

6. The antenna arrangement as claimed in claim 5, wherein the one or more apertures of the second dielectric substrate, the one or more apertures of the dielectric substrate, and the multiple patch antenna elements are aligned, wherein the at least one aperture in the second dielectric substrate for feeding the slot antenna is aligned with the slot of the slot antenna.

7. The antenna arrangement as claimed in claim 4, comprising a first feed arrangement extending from an interior portion of the second dielectric substrate to the multiple patch antenna elements, and a second feed arrangement extending from an interior portion of the second dielectric substrate to the slot of the slot antenna.

8. The antenna arrangement as claimed in claim 1, wherein the slot defined with one or more conductive portions comprises:

an elongate first slot-path extending lengthwise from a feed location in a first direction; and an elongate second slot-path extending lengthwise from the feed location in a second direction different to the first direction.

9. The antenna arrangement as claimed in claim 8, wherein the elongate first slot-path extends lengthwise a first distance in the first direction from the feed and then bifurcates into an elongate first bifurcated slot path and an elongate second bifurcated slot path, wherein:

the elongate first bifurcated slot path is close-ended and terminates at a first closed end;

the elongate second bifurcated slot path is open-ended and terminates at an open end in an edge of the antenna arrangement; and the elongate second slot path is close-ended and terminates at a second closed end.

10. The antenna arrangement as claimed in claim 1, wherein the multiple patch antenna elements in combination with a ground plane provided with the one or more conductive portions overlapped with the multiple patch antenna elements provide the antenna array.

11. The antenna arrangement as claimed in claim 1, wherein the multiple patch antenna elements are positioned closer to the upper edge of the dielectric substrate than a feed for the slot antenna or wherein the multiple patch antenna elements are positioned further from the upper edge of the dielectric substrate than a feed for the slot antenna.

12. The antenna arrangement as claimed in claim 1, configured as a module, wherein the module comprises a multilayer printed circuit board that provides the dielectric substrate, the multiple patch antenna elements, and the one or more conductive portions.

13. An apparatus comprising at least one aperture located at a rim defined by an edge of the apparatus; and, in the at least one aperture, a module comprising the antenna arrangement as claimed in claim 1.

14. An apparatus comprising multiple antenna arrangements as claimed in claim 1, the antenna arrangements being located within an aperture located at the rim of the apparatus, wherein the antenna arrangements are arranged for multiple-input multiple-output operation.

* * * * *